(12) United States Patent
Chizek et al.

(10) Patent No.: US 9,004,452 B2
(45) Date of Patent: Apr. 14, 2015

(54) VALVE BODIES HAVING INTEGRAL BOOST REDUCING CAPABILITY

(75) Inventors: Jared B. Chizek, Maple Grove, MN (US); David Blair Davis, Whitewright, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 679 days.

(21) Appl. No.: 13/249,517

(22) Filed: Sep. 30, 2011

(65) Prior Publication Data

US 2012/0104303 A1    May 3, 2012

Related U.S. Application Data

(60) Provisional application No. 61/408,958, filed on Nov. 1, 2010.

(51) Int. Cl.
*F16K 1/00* (2006.01)
*G05D 16/06* (2006.01)

(52) U.S. Cl.
CPC .................................. *G05D 16/0688* (2013.01)

(58) Field of Classification Search
CPC .......... G05D 16/0655; G05D 16/0658; G05D 16/0675; G05D 16/0683; G05D 16/0686; G05D 16/0688
USPC ............ 251/324, 333, 366; 137/484.4, 484.6, 137/484.8, 494, 497, 505.36, 505.46, 137/505.23, 505.26
See application file for complete search history.

(56) References Cited

U.S. PATENT DOCUMENTS

| 317,991 A | 5/1885 | Griffin |
| 1,064,609 A | 6/1913 | Caldwell et al. |
| 1,885,389 A | 11/1932 | Temple |

(Continued)

FOREIGN PATENT DOCUMENTS

| GB | 462656 | 3/1937 |
| GB | 2079411 | 1/1982 |
| WO | 9851951 | 11/1998 |

OTHER PUBLICATIONS

International Searching Authority, "Partial Search Report," issued in connection with application serial No. PCT/US2011/056565, mailed Feb. 3, 2012, 2 pages.

(Continued)

*Primary Examiner* — Marina Tietjen
(74) *Attorney, Agent, or Firm* — Hanley, Flight & Zimmerman, LLC

(57) ABSTRACT

Valve bodies having integral boost reducing capability are described herein. An example fluid regulator includes a body having a main passageway defining an orifice to fluidly couple an inlet and an outlet where the main passageway defines an inlet volume boundary between the inlet and the orifice and an outlet volume boundary between the orifice and the outlet. A portion of the outlet volume boundary includes an inner wall adjacent the orifice. A valve plug is disposed within the second portion of the passageway such that the inner wall substantially surrounds an outer surface of the valve plug to substantially restrict fluid flow between the inner wall and the outer surface of the valve plug and toward the throat. The valve body having a secondary fluid passage within the outlet volume boundary to increase fluid flow toward the throat of the valve body when a fluid flows across the orifice.

22 Claims, 6 Drawing Sheets

(56) References Cited

U.S. PATENT DOCUMENTS

| | | | |
|---|---|---|---|
| 2,114,139 A | 4/1938 | Crosthwait, Jr. et al. | |
| 2,182,701 A | 12/1939 | Niesemann | |
| 2,215,419 A | 9/1940 | Cheeseman | |
| 2,315,370 A | 3/1943 | Hughes | |
| 2,336,653 A | 12/1943 | Taylor | |
| 2,433,507 A | 12/1947 | Delany | |
| 2,435,057 A | 1/1948 | Temple | |
| 2,619,983 A | 12/1952 | Roberts | |
| 2,642,254 A | 6/1953 | Armstrong | |
| 2,649,273 A | 8/1953 | Honegger | |
| 2,827,069 A | 3/1958 | Peterson | |
| 3,449,923 A | 6/1969 | Hansen et al. | |
| 3,488,685 A * | 1/1970 | Hughes | 137/116.5 |
| 3,705,599 A * | 12/1972 | Sheward | 137/116.5 |
| 3,722,536 A | 3/1973 | Hill et al. | |
| 3,742,972 A * | 7/1973 | Hughes | 137/110 |
| 3,776,278 A | 12/1973 | Allen | |
| 3,857,542 A | 12/1974 | Heymann | |
| 3,955,759 A | 5/1976 | Knapp | |
| 4,069,839 A * | 1/1978 | Hughes | 137/505.46 |
| 4,258,750 A | 3/1981 | Schnall et al. | |
| 4,491,149 A | 1/1985 | Trinkwalder | |
| 4,745,941 A | 5/1988 | Nilsson | |
| 4,754,778 A | 7/1988 | Duffy et al. | |
| 4,754,788 A | 7/1988 | Schmidt | |
| 4,892,118 A | 1/1990 | Davis et al. | |
| 4,905,798 A | 3/1990 | Engelsdorf et al. | |
| 5,044,604 A | 9/1991 | Topham et al. | |
| 5,150,736 A | 9/1992 | Vincent de Paul et al. | |
| 5,156,188 A | 10/1992 | Wakita et al. | |
| 5,269,333 A | 12/1993 | Richmond | |
| 5,318,270 A | 6/1994 | Detanne et al. | |
| 5,649,686 A | 7/1997 | Wilson | |
| 5,697,398 A * | 12/1997 | Gidney et al. | 137/484.8 |
| 6,082,405 A | 7/2000 | Qvarfordh et al. | |
| 6,464,201 B2 | 10/2002 | Job | |
| 6,820,594 B2 | 11/2004 | Rodriguez-Amaya et al. | |
| 7,028,712 B2 | 4/2006 | Wears et al. | |
| 7,104,281 B2 | 9/2006 | Stares et al. | |
| 2005/0166976 A1 | 8/2005 | Folk et al. | |
| 2008/0258096 A1 | 10/2008 | Hawkins | |
| 2012/0103440 A1 | 5/2012 | Chizek et al. | |

OTHER PUBLICATIONS

International Bureau, "International Preliminary Report on Patentability", issued in connection with International Application No. PCT/US2011/056565, mailed on May 16, 2013, 12 pages.

International Searching Authority, "International Search Report," issued in connection with international application serial No. PCT/US2011/056569, mailed Mar. 21, 2012, 2 pages.

International Searching Authority, "Written Opinion of the International Searching Authority," issued in connection with international application serial No. PCT/US2011/056569, mailed Mar. 21, 2012, 6 pages.

International Searching Authority, "International Search Report," issued in connection with international application serial No. PCT/US2011/056565, mailed Mar. 22, 2012, 4 pages.

International Searching Authority, "Written Opinion of the International Searching Authority," issued in connection with international application serial No. PCT/US2011/056565, mailed Mar. 22, 2012, 10 pages.

Actaris, "B34 Commercial and Industrial Regulator," product bulletin, Jun. 2002, 16 pages.

The United States Patent and Trademark Office, "Non-Final Office Action," issued in connection with U.S. Appl. No. 13/249,515, dated Oct. 22, 2014, 17 pages.

* cited by examiner

VALVE BODIES HAVING INTEGRAL BOOST REDUCING CAPABILITY

CROSS REFERENCE TO RELATED APPLICATION

This patent claims the benefit of U.S. Provisional Patent Application Ser. No. 61/408,958, filed on Nov. 1, 2010, entitled VALVE BODIES HAVING INTEGRAL BOOST REDUCING CAPABILITY, which is incorporated herein by reference in its entirety.

FIELD OF THE DISCLOSURE

The present disclosure relates generally to fluid regulators and, more particularly, to valve bodies having integral boost reducing capability.

BACKGROUND

Fluid regulators are commonly used to reduce the pressure of a fluid and regulate the pressure to a substantially constant value. Specifically, a fluid regulator has an inlet that receives a supply fluid at a relatively high pressure and provides a relatively lower set control pressure at an outlet. Inlet pressure is reduced to a lower outlet pressure by restricting flow through an orifice to substantially match the fluctuating downstream demand. For example, a gas regulator associated with a piece of equipment (e.g., a boiler) may receive a gas having a relatively high and somewhat variable pressure from a gas distribution source and may regulate the gas to have a lower, substantially constant or control pressure suitable for safe, efficient use by the equipment.

Fluid regulators are often classified based on the ability of the fluid regulator to maintain an outlet pressure at a set control pressure when the fluid regulator is exposed to a range of pressure differentials. A fluid regulator that deviates an unacceptable amount from the set control pressure when the fluid regulator is exposed to a particular pressure differential is deemed to be outside the classification or accuracy class of the regulator. Deviation from the set control pressure is often caused by droop and/or boost flow characteristics of the fluid regulator. Boost flow characteristics can significantly degrade the accuracy and/or capacity classification of a fluid regulator.

SUMMARY

In one example, a fluid regulator includes a body having a main passageway defining an orifice to fluidly couple an inlet and an outlet where the main passageway defines an inlet volume boundary between the inlet and the orifice and an outlet volume boundary between the orifice and the outlet. A portion of the outlet volume boundary includes an inner wall adjacent the orifice. A valve plug is disposed within the second portion of the passageway such that the inner wall substantially surrounds an outer surface of the valve plug to substantially restrict fluid flow between the inner wall and the outer surface of the valve plug and toward the throat. The valve body having a secondary fluid passage within the outlet volume boundary to increase fluid flow toward the orifice.

In another example, a fluid valve body includes a first passageway integrally formed with the valve body to define an orifice that fluidly couples an inlet of the passageway to an outlet of the passageway and a second passageway integrally formed with the valve body to increase a fluid flow rate between the orifice of the first passageway and a throat area of the valve body.

DETAILED DESCRIPTION

The example fluid regulators described herein modulate the flow of fluid to maintain downstream pressures within acceptable pressure limits based on a set control pressure. Additionally, the fluid regulators include example valve bodies having integral boost reducing capability to significantly increase the rated capacity and/or accuracy classification of the fluid regulators. In particular, an example valve body described herein controls boost and/or prevents excessive boost of a fluid regulator when the fluid regulator is exposed to relatively high velocity fluid flows. In other words, the example valve bodies described herein enable a fluid regulator to obtain an accuracy classification over a wider range of operating pressure differentials than, for example, a fluid regulator implemented with a conventional valve body.

In particular, an example valve body defines a primary or main fluid flow passageway having an orifice that fluidly couples an inlet and an outlet of the valve body and a secondary passageway to fluidly couple the orifice to a throat area of the valve body. More specifically, the main passageway includes an inner wall adjacent the orifice that, in combination with a valve plug disposed within the passageway, substantially restricts fluid flow in a direction toward the throat of the valve body. Specifically, the inner wall and the valve plug deflect or direct fluid flowing through the orifice of the passageway toward an outlet of the valve body and away from the throat area. Directing fluid away from the throat area may reduce droop flow characteristics. However, directing the fluid away from the throat area may also increase or cause excessive boost when a fluid flows through the orifice at a relatively high pressure differential.

The secondary passageway provides a fluid flow path to fluidly couple the orifice and the throat area. Thus, fluid that is otherwise directed or deflected away from the throat area by the valve plug and the inner wall can flow or move within the throat area via the second passageway. In other words, the secondary passageway creates droop to prevent excessive boost flow characteristics when a fluid flows across an orifice of the primary passageway at a relatively high velocity.

The second passageway may be, for example, a gap, a channel, a conduit, a port or other passage that is integrally formed in the inner wall portion. In some examples, the secondary passage may include a plurality of gaps or ports that define one or more wall portions radially spaced about an axis of an orifice. The secondary passageway controls boost flow characteristics (e.g., by creating droop), thereby providing a more accurate fluid regulator and improving the ability of the fluid regulator to accurately meet downstream demand over a greater range of operating parameters (e.g., inlet pressures or pressure differentials).

Figure 1:
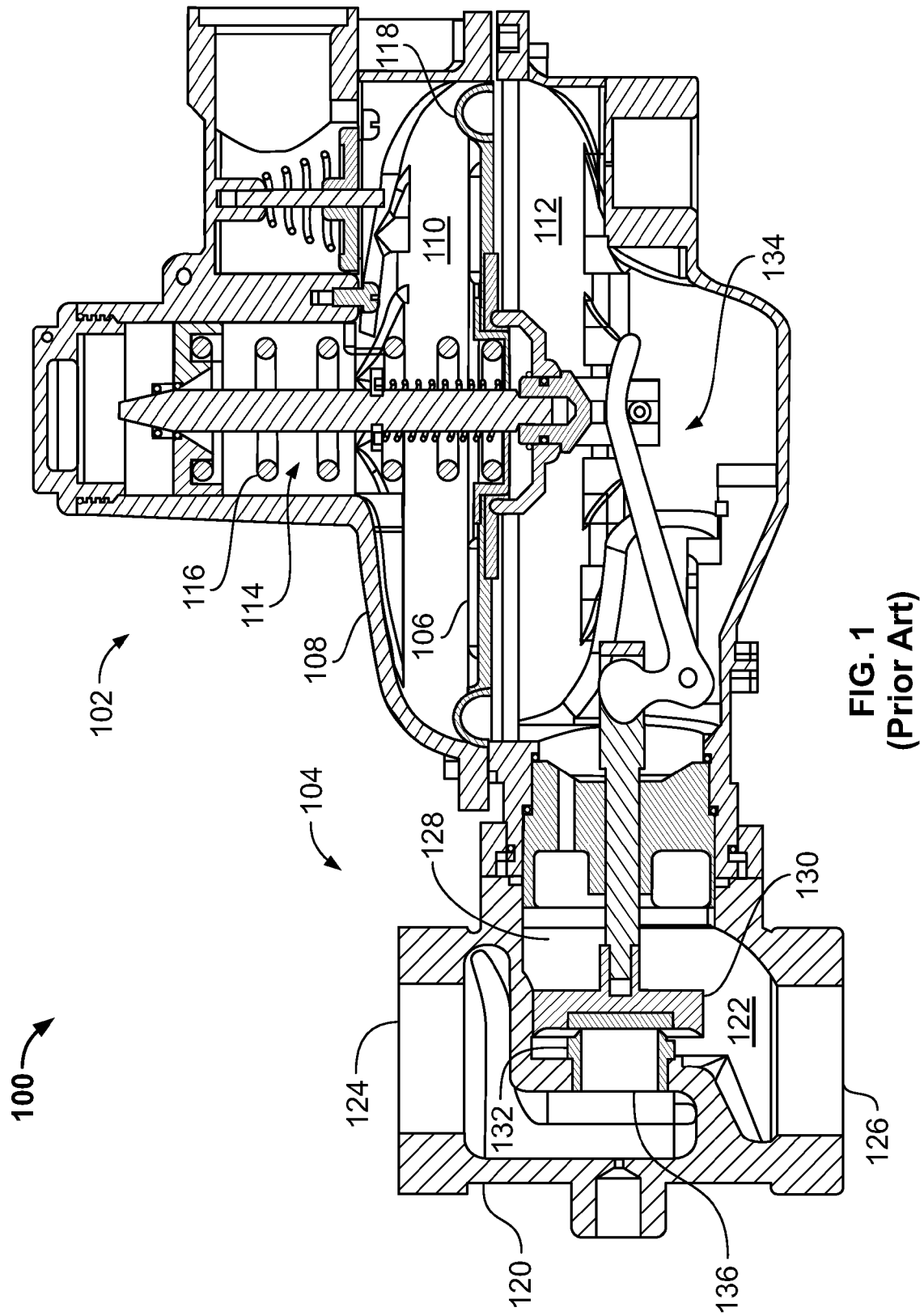
FIG. 1 illustrates a known self-operating fluid regulator having a conventional valve body.

Before discussing the details of the example regulators and valve bodies having integral boost reducing capability, a description of a known self-regulating fluid regulator 100 is provided in FIG. 1. As shown in FIG. 1, the regulator 100 includes an actuator 102 that is coupled to a regulator valve 104. The actuator 102 includes a diaphragm 106 that is captured within an actuator housing 108 to define a loading chamber 110 and a sensing chamber 112. The loading chamber 110 includes a loading apparatus 114 such as, for example, a control spring 116 that provides a set or control load or pressure to a first side 118 of the diaphragm 106. Typically, the control load or pressure provided by the loading apparatus 114 corresponds to a desired outlet pressure to be provided by the fluid regulator 100.

The regulator valve 104 includes a valve body 120 defining a fluid passageway 122 between an inlet 124 and an outlet 126. The valve body 120 is coupled to the actuator housing 108 such that a throat 128 of the valve body 120 is in fluid communication with the sensing chamber 112 so that the sensing chamber 112 can sense the pressure of the fluid at the outlet 126 of the valve body 120. A valve plug 130 is disposed within the passageway 122 and moves relative to a valve seat 132 to control the fluid flow through the passageway 122. To couple the diaphragm 106 and the valve plug 130, the fluid regulator 100 employs a linkage assembly 134.

In operation, the diaphragm 106 moves the valve plug 130 via the linkage assembly 134 in response to a pressure differential across the diaphragm 108 provided by an outlet pressure sensed by the sensing chamber 112 (via the throat 128) and the set or control pressure provided by the loading apparatus 114 (i.e., the spring force provided by the control spring 116). As downstream demand increases, the downstream fluid flow requirement increases and the downstream pressure decreases. The sensing chamber 112 senses the pressure at the outlet 126 via the throat 128. A pressure sensed by the sensing chamber 112 that is less than the control pressure provided by the loading apparatus 114 to the first side 118 of the diaphragm 108 results in a pressure differential across the diaphragm 106 that causes the diaphragm 106 to move in a direction toward the sensing chamber 112. In turn, the diaphragm 108 causes the valve plug 130 to move away from the valve seat 132 to allow fluid flow through the passageway 122. When the downstream demand decreases, the pressure at the outlet 126 increases and the fluid flow demand decreases. An outlet pressure sensed by the sensing chamber 112 (i.e., via the throat 128) that is greater than the control pressure provided by the loading apparatus 114 results in a pressure differential across the diaphragm 106 that causes the diaphragm 106 to move toward the loading chamber 110. In turn, the diaphragm 106 moves the valve plug 130 toward the valve seat 132 to restrict or prevent fluid flow through the passageway 122.

The fluid regulator 100 may be categorized by a certain capacity rating or accuracy classification based on the ability of the fluid regulator 100 to maintain an outlet pressure at the set control pressure when the fluid regulator 100 is exposed to a range of pressure differentials and, thus, fluid flow rates. When the fluid regulator 100 provides a downstream outlet pressure that deviates an unacceptable amount from the set control pressure when the fluid regulator 100 is exposed to a particular pressure differential, the fluid regulator 100 is no longer controlling within rated accuracy classification or capacity.

Unacceptable deviation from the set control pressure is often caused by boost flow characteristics as process fluid flows through the fluid regulator 100 at a relatively high velocity. As a result, boost significantly affects or degrades the accuracy and/or capacity of the fluid regulator 100.

For example, the regulator 100 may create boost when the downstream pressure increases (e.g., suddenly increases) and the fluid flows through the passageway 122 at a relatively high velocity. The relatively high pressure differentials across an orifice 136 may cause the pressure area in the throat 128 to be lower than the downstream pressure or pressure at the outlet 126. As a result, the sensing chamber 122 senses a lower pressure (than the outlet pressure) and causes the regulator 100 to allow more fluid flow toward the outlet 126 (as opposed to moving the valve plug 120 toward the valve seat 132). As a result, the output pressure of the fluid regulator 100 may deviate from the set control pressure.

Boost may be created or caused by many factors such as, for example, a varying spring force of the control spring 116 as the diaphragm 106 moves toward the sensing chamber 112, the fluctuating area of the diaphragm 106 as the diaphragm 106 deflects or moves due to the pressure differential across the diaphragm 106, the size of the orifice 136 of the passageway 122, the inlet pressure of the process fluid, the pressure differential across the orifice 136, the valve plug 130, etc.

Figure 2:
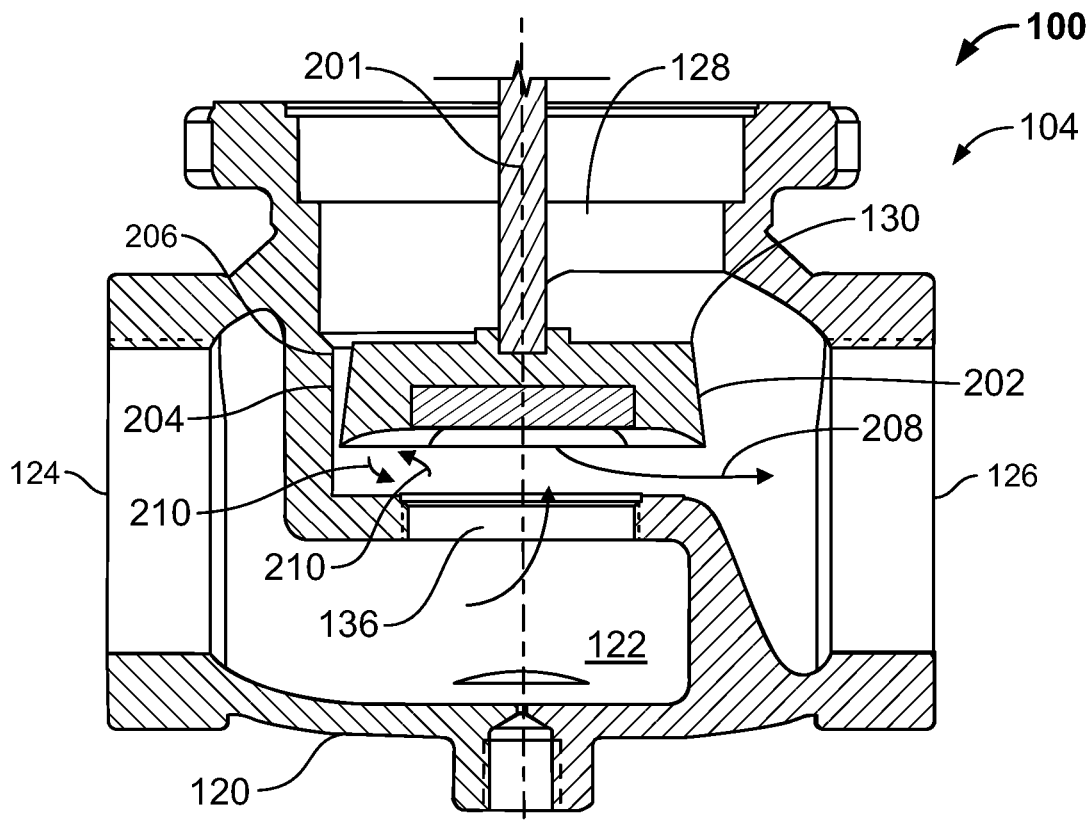
FIG. 2 is a partial, enlarged cross-sectional view of the valve body of FIG. 1.
Figure 3:
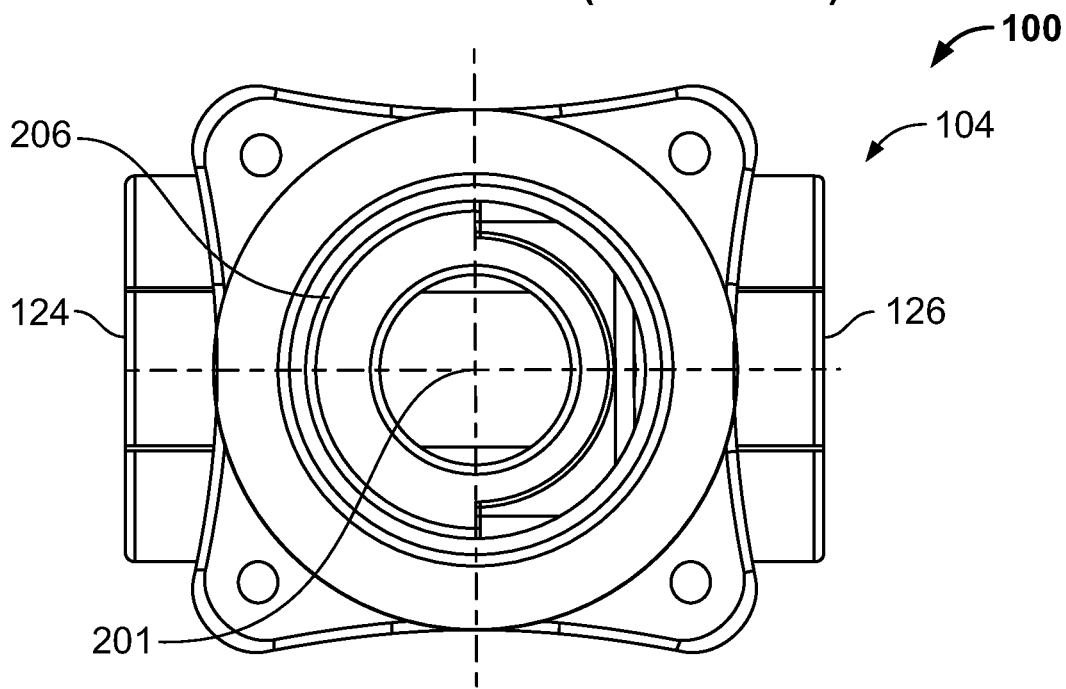
FIG. 3 is a plan view of the valve body of FIGS. 1 and 2.

FIG. 2 is an enlarged, partial view of the example regulator 100 of FIG. 1 illustrating fluid flowing through the passageway 122. FIG. 3 is a plan view of the valve body 120.

As shown in greater detail in FIGS. 2 and 3, the valve plug 130 is disposed within the passageway 122 such that an outer surface 202 of the valve plug 130 is disposed adjacent an inner surface 204 of an inner wall 206 of the valve body 120 to have a relatively tight fit or tolerance. In this manner, the inner wall 206 of the valve body 120 (e.g., adjacent the inlet side of the orifice 136) and the valve plug 130 direct the fluid flowing through the passageway 122 in a direction 208 toward the outlet 126 as the fluid flows through the orifice 136. Additionally, the inner wall 206 and the valve plug 130 substantially restrict fluid flow from the orifice 136 toward the throat 128 and, thus, the sensing chamber 122 because the valve plug 130 is in close proximity to the outer surface 202 of the valve plug 130. As most clearly shown in FIG. 3, the inner wall 206 is disposed radially relative to a circumference of the throat 128 and protrudes inwardly toward an axis 201 of the orifice 136.

Thus, the inner wall 206 and the valve plug 130 provide a droop reducing mechanism (by increasing boost) when a fluids flows across the orifice 136 at a relatively low velocity. In other words, as fluid flows between the inlet 124 and the outlet 126, the inner wall 206 and the valve plug 130 direct the fluid away from the throat 128 or sensing chamber 122 in either the downstream direction 208 toward the outlet 126 or in an opposite direction 210 toward the orifice 136.

However, for relatively high pressure applications, directing the fluid flow in the direction 210 causes the pressure of the fluid at the orifice 136 to increase. As the pressure of the fluid at the orifice 136 increases, fluid within in the passageway 122 flows across the orifice 136 at a relatively high velocity. Thus, for applications having relatively high inlet pressures or high pressure differentials, the process fluid flows through the passageway 122 at a relatively high velocity or relatively high momentum and the inner wall 206 and the valve plug 130 may cause a low pressure area at the throat 128 of the valve body 120.

In turn, the sensing chamber 112 may sense a pressure at the throat 128 that is lower than the pressure downstream of the outlet 126 because the fluid is flowing through the passageway 122 at a relatively high velocity and away from the sensing chamber 112, thereby creating a low pressure area or zone in the throat 128. As a result, the fluid regulator 100 causes the valve plug 120 to move away from the valve seat 132 to allow more fluid flow through the passageway 122, thereby providing more downstream fluid flow than is required. As a result, the pressure at the outlet 126 increases above the desired or set control pressure provided by the control spring 116 (i.e., causes boost), thereby degrading the accuracy of the fluid regulator 100 for applications having relatively low inlet pressures. As a result, the fluid regulator 100 will typically have a lower accuracy classification and/or capacity.

Figure 4:
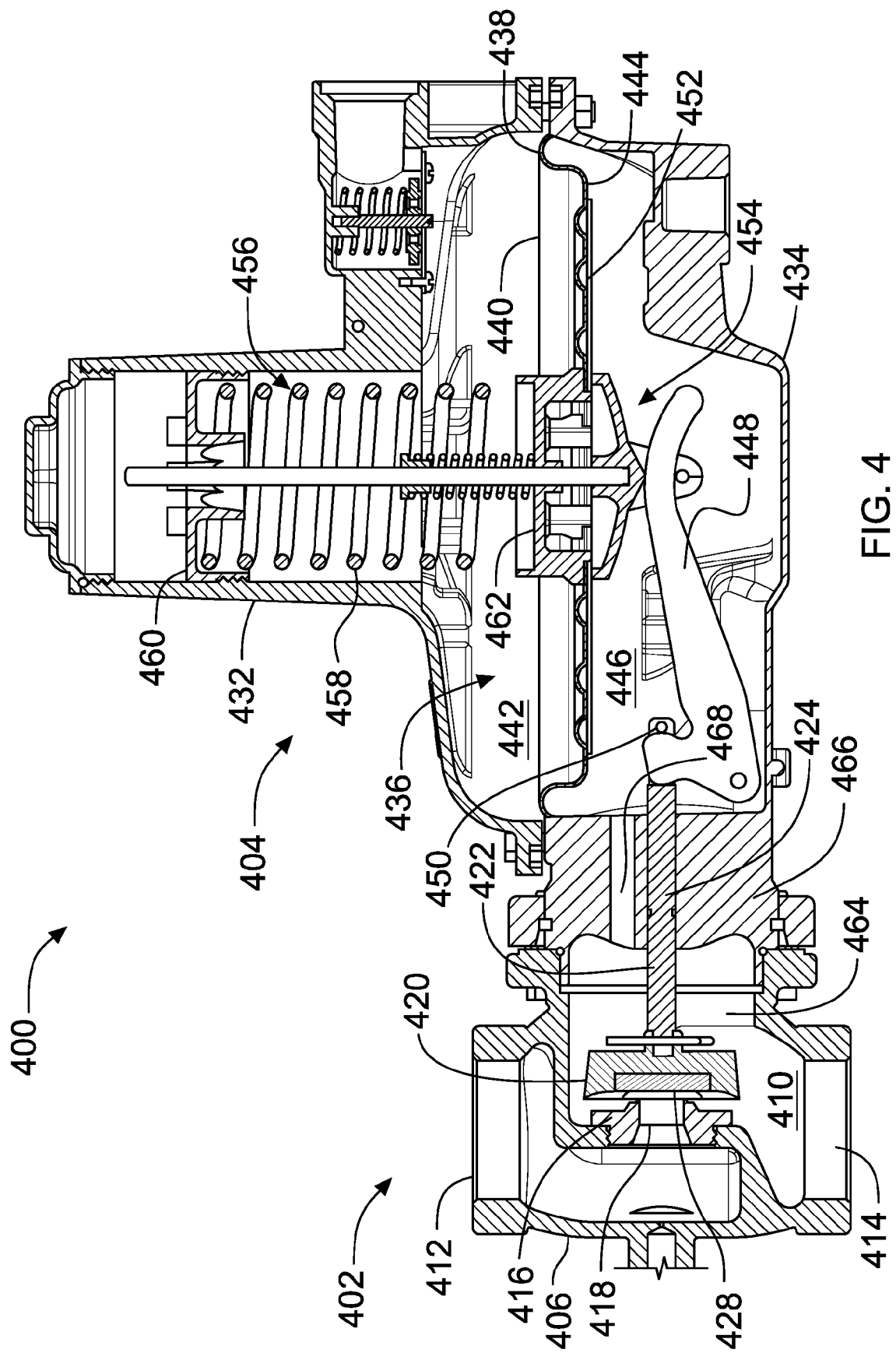
FIG. 4 illustrates a fluid regulator having an example valve body described herein.

FIG. 4 illustrates an example fluid regulator 400 implemented with an example regulator valve 402 described herein having integral boost reducing capability to prevent excessive boost when the fluid regulator 400 is exposed to relatively high velocity fluids flows, thereby significantly increasing the accuracy classification and the rated capacity of the fluid regulator 400. In other words, the regulator valve 402 controls boost of the fluid regulator 400 by creating or increasing droop of the fluid regulator 400 to prevent excessive boost when a high pressure fluid flows through the fluid regulator 400 at a relatively high velocity.

Referring to FIG. 4, the example fluid regulator 400 includes an actuator 404 that is operatively coupled to the regulator valve 402. The regulator valve 402 includes a valve body 406 that defines a main fluid flow passageway 410 between an inlet 412 and an outlet 414. The inlet 412 may be fluidly coupled to a distribution system (e.g., a natural gas distribution system) upstream from the fluid regulator 400 and the outlet 414 may be fluidly coupled to a consumption source such as, for example, a boiler downstream from the fluid regulator 400.

A valve seat 416 is mounted in the passageway 410 of the valve body 406 and defines an orifice 418 through which fluid may flow between the inlet 412 and the outlet 414. To control the fluid flow through the passageway 410, the regulator valve 402 includes a flow control member or a valve plug 420 (e.g., a sealing disc) that moves relative to the valve seat 416. The valve plug 420 (e.g., a sealing disc) is coupled to an end 422 of a stem 424 and includes a sealing disk 428, which may be made of an elastomeric material, that sealingly engages a sealing surface of the valve seat 416 when the stem 424 and valve plug 420 are moved toward the valve seat 416 to restrict or prevent fluid flow through the passageway 410.

The actuator 404 includes an upper casing 432 and a lower casing 434 that contain a diaphragm assembly 436. The diaphragm assembly 436 includes a diaphragm 438 captured between the upper casing 432 of the actuator 404 and the lower casing 434 of the actuator 404 such that a first side 440 of the diaphragm 438 and the upper casing 432 define a loading chamber 442 and a second side 444 of the diaphragm 438 and the lower casing 434 define a sensing chamber 446. A lever 448 operatively couples the diaphragm 438 and the valve plug 420 and is coupled to a second end 450 of the valve stem 424. The lever 448 is coupled to the diaphragm 438 via a diaphragm plate 452 and a pusher post assembly 454. The diaphragm 438 moves the valve plug 420 (e.g., a sealing disc) relative the valve seat 416 via the lever 448 to control the fluid flow between the inlet 412 and the outlet 414.

A loading assembly 456 is disposed within the loading chamber 442 that adjusts to provide a control pressure. In this example, the loading assembly 456 includes a closing spring 458 disposed between an adjustable spring seat 460 and a second spring seat 462 (e.g., a body portion of the diaphragm plate 452). The closing spring 458 provides a set load or force (e.g., a downstream control pressure) that biases the first side 440 of the diaphragm 438 toward the sensing chamber 446 to move the valve plug 420 away from the valve seat 416 (e.g., an open position). The amount of force exerted by the closing spring 458 can be adjusted (e.g., increased or decreased) via the adjustable spring seat 460.

The valve body 406 is coupled to the lower casing 434 of the actuator 404 such that the sensing chamber 446 is in fluid communication with the outlet 414 via a valve mouth or throat area 464. A stem guide 466 aligns the valve stem 424 and the valve plug 420 with at least one of the lower actuator casing 434, the valve body 406, or the valve seat 416. The stem guide 466 also includes at least one passageway 468 to fluidly couple the sensing chamber 446 to the throat area 464 and the outlet 414. When the force provided by the control spring 456 is overcome by a force provided by a pressure of a fluid in the sensing chamber 446, the diaphragm 438 moves toward the loading chamber 442 and causes the valve plug 420 to move toward the valve seat 416 to restrict or prevent the flow of fluid through the passageway 410 (e.g., a closed condition).

Figure 5A:
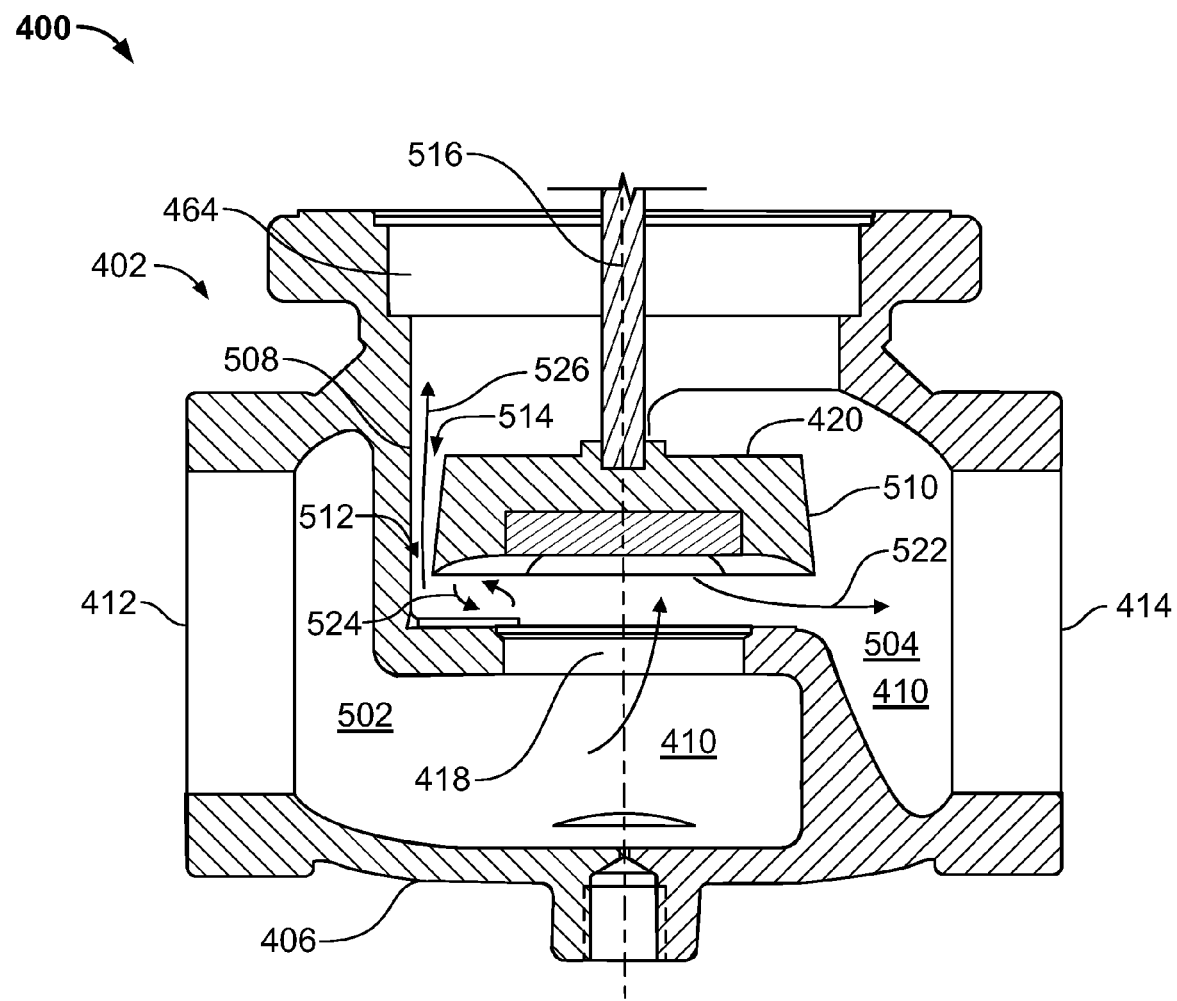
FIG. 5A is a cross-sectional view of the example valve body of FIG. 4.
Figure 5B:
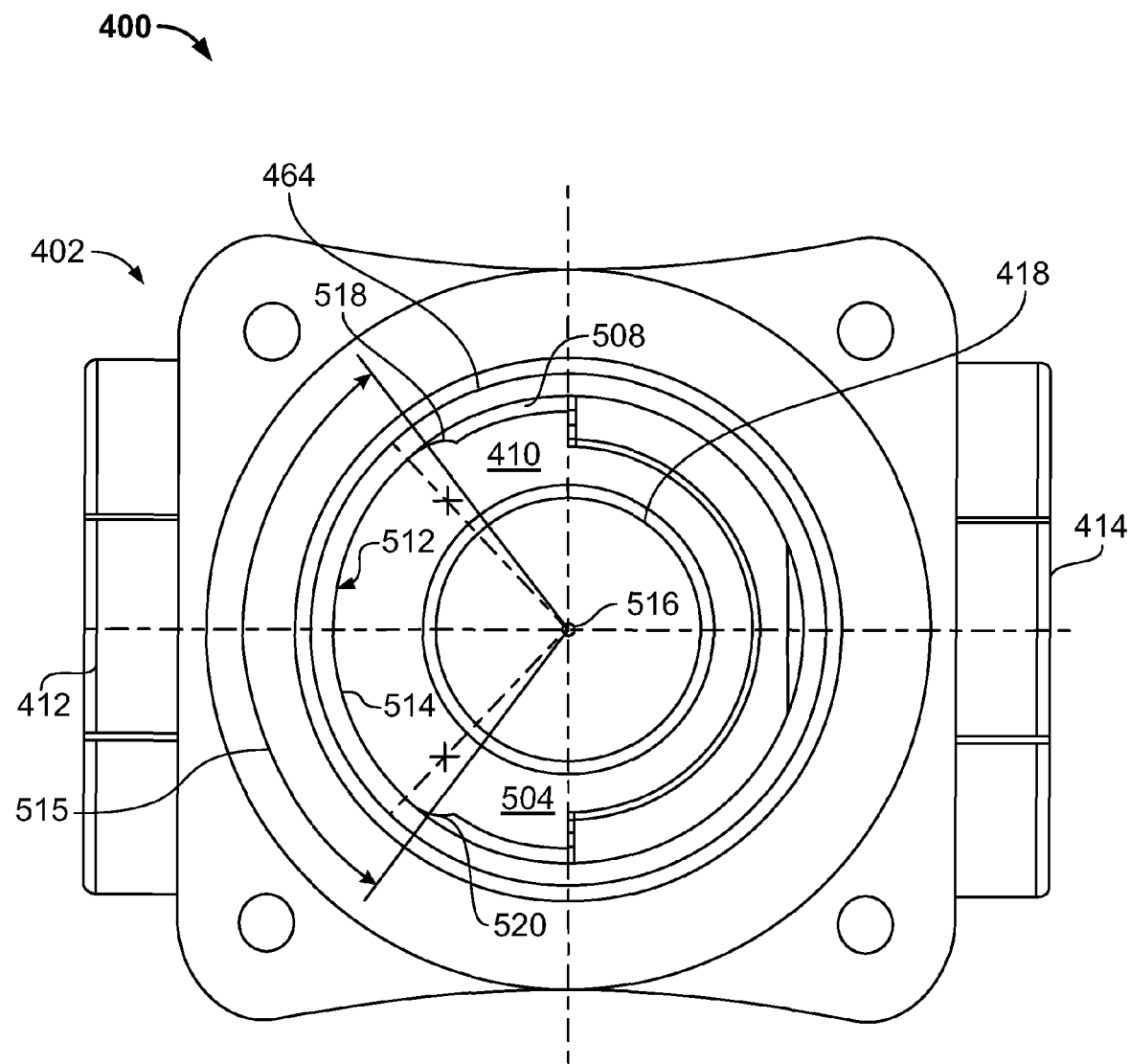
FIG. 5B is a plan view of the example valve body of FIGS. 4 and 5A.

FIG. 5A is a cross-sectional view of the valve body 406 of FIG. 4. FIG. 5B is plan view of the valve body 406 of FIGS. 4 and 5A. Referring to FIGS. 5A and 5B, the main passageway 410 defines an inlet volume boundary 502 between the inlet 412 and the orifice 418 and an outlet volume boundary 504 between the orifice 418 and the outlet 414. The outlet volume boundary 504 defines a flow path downstream from the orifice 418 that is at least partially defined by an inner wall 508 of the valve body 406. To substantially restrict fluid flow toward the throat area 464 between the inner wall 508 and an outer surface 510 of the valve plug 420, the inner wall 508 substantially surrounds or encircles the valve plug 420 when the valve plug 420 is disposed within the outlet volume boundary 504. In this example, the inner wall 508 is adjacent the orifice 418 and upstream from the outlet 414. Further, the inner wall 508 is adjacent the throat area 464. Thus, when the valve plug 420 is disposed within the outlet volume boundary 504 of the passageway 410, at least a portion of the inner wall 508 is immediately adjacent the outer surface 510 of the valve plug 420. Although the outer surface 510 of the valve plug 420 is in relatively close proximity to the inner wall 508, the outer surface 510 of the valve plug 420 does not engage the inner wall 508.

To reduce boost of the fluid regulator 400 and as most clearly shown in FIG. 5B, the valve body 406 includes a secondary passage 512. In this example, the secondary passage 512 is adjacent the orifice 418 and upstream from the outlet 414. In particular, the secondary passage 512 fluidly couples the orifice 418 and the throat area 464. In this manner, the secondary passage 512 directs or channels fluid flow toward the throat area 464 and, thus, the sensing chamber 446 of the actuator 404 when a fluids flows across the orifice 418. In other words, the secondary passage 512 reduces boost of the fluid regulator 400 by creating or increasing a droop effect to significantly reduce or prevent excessive boost when a process fluid flows across the orifice 418 at a relatively high velocity.

In the illustrated example, the secondary passage 512 is integrally formed with the valve body 406. More specifically, in this example, the secondary passage 512 is integrally formed with the inner wall 508. As most clearly shown in FIG. 5B, the secondary passage 512 is provided via a gap or opening 514 formed within the inner wall 508. As most clearly shown in FIG. 5A, the gap 514 extends in a direction along a longitudinal axis 516 of the orifice 418 between the orifice 418 and the throat area 464 of the valve body 406. In other words, the gap 514 has a length (e.g., a vertical length) that extends between the orifice 418 and the throat area 464 to allow fluid flow between the orifice 418 and the throat area 646.

Further, as most clearly shown in FIG. 5B, the secondary passage 512 or the gap 514 extends over a portion or perimeter of the inner wall 508. In other words, the gap 514 defines two opposing ends 518 and 520 of the inner wall 508. Thus, the gap 514 provides an opening or split in the inner wall 508 such that the inner wall 508 has a C-shaped cross-section when taken in a plane perpendicular to the longitudinal axis 516 of the orifice 418. In this example, the opposing ends 518 and 520 are substantially parallel to the longitudinal axis 516 of the orifice 418 so that the gap 514 (or the secondary passage 512) provides a substantially perpendicular or straight fluid flow path (e.g., a flow path that is substantially parallel to the longitudinal axis 516). However, in other examples, the longitudinal lengths of the opposing ends 518 and 520 of the inner wall 508 may be at an angle relative to the longitudinal axis 516 so that the gap 514 or the secondary passage 512 provides an angled or tapered flow path between the orifice 418 and the throat area 464.

Additionally, still referring to FIG. 5B, the size of the opening provided by the gap 514 may extend over any portion of the circumference or perimeter of the inner wall 508. For example, in FIG. 5B, the gap 514 may be sized to provide an opening that spaces the opposing ends 518 and 520 of the wall 508 at any desired angle 515. For example, the gap 514 may space the opposing ends 518 and 520 between about 5 degrees and 180 degrees relative to the axis 516. In this particular example, the angle 515 between the opposing ends 518 and 520 of the inner wall 508 provided by gap 514 is approximately 100 degrees. In other words, the size of the gap 514 may be varied to control the boost and/or the droop of the fluid regulator 400. For example, a larger sized gap 514 provides relatively more fluid flow toward the throat area 464, thereby creating more droop and reducing boost. In contrast, a smaller sized gap 514 provides relatively less fluid flow toward the throat area 464, thereby creating more boost and reducing droop.

Although not shown, in other examples, the secondary passage 512 may be a channel, a slot, a groove, a port, a conduit (e.g., formed in the valve body) or any other passage that provides fluid communication between the orifice 418 and the throat area 464. Additionally, the secondary passage 512 may be parallel to the longitudinal axis 516 of the orifice 418 (i.e., substantially vertical), or the secondary passage 512 may be at an angle relative to the longitudinal axis 516. For example, as shown in FIG. 5B, the ends 518 and 520 have curved surfaces.

Further, in this example, the secondary passage 512 has a uniform shape or profile (e.g., has a uniform flow path) between the orifice 418 and the throat area 464. In other examples, the secondary passageway 512 may include a non-uniform shape or profile (e.g., a non-uniform flow path) between an opening in fluid communication with the orifice 418 and an opening in fluid communication with the throat 464. For example, the fluid flow path of the secondary passage 512 may open between a first portion adjacent the orifice 418 and a second portion adjacent the throat area 464, or the flow path may narrow to restrict fluid flow between a first portion adjacent the orifice 418 and a second portion adjacent the throat 464.

In yet other examples, the longitudinal lengths (e.g., the vertical length between the orifice 418 and the throat area 464) of the secondary passageway 512 may partially extend between the throat area 464 and the orifice 418. For example, by partially extending the secondary passage 512 between the orifice 418 and the throat area 464, fluid flow between the orifice 418 and the throat area 464 can be further controlled. For example, the secondary passage 512 that is in fluid communication with the orifice 464 can be positioned above a lower portion of the inner wall 508 such that fluid flow is permitted between the orifice 418 and the throat area 464 when the valve plug 420 is at a first position away from the valve seat 416, but the inner wall 508 and the valve plug 420 restrict or block fluid flow between the orifice 418 and the throat area 464 when the valve plug 420 is at a second position away from the valve seat 416. Thus, the secondary passage 512 allows fluid flow between the orifice 418 and the throat area 464 only when the valve plug 420 moves away from the opening of the secondary passage 512 (e.g., when the valve plug 420 is in the first position away from the valve seat 416).

In operation, referring to FIGS. 4, 5A and 5B, fluid pressure and flow regulation are achieved by modulating the fluid flow through the passageway 410 to maintain a required downstream pressure at the outlet 414 while delivering the quantity of fluid demanded by a downstream load (e.g., by the consumption source). The actuator 404 regulates the pressure at the outlet 414 in accordance with a desired outlet pressure provided or set by the control spring 458. In particular, the actuator 404 moves the valve plug 420 relative to the valve seat 416 to reduce a relatively higher inlet pressure to a desired lower outlet pressure based on the set control pressure provided by the control spring 458. Thus, adjustment of the control spring 458 changes the pressure to be provided at the outlet 414.

In particular, the sensing chamber 446 senses the pressure of the fluid at the throat area 464, which provides a force or pressure to the second side 444 of the diaphragm 438 that opposes the force or pressure of the control spring 458 imparted to the first side 440 of the diaphragm 438. When a pressure sensed by the sensing chamber 446 is substantially equal to the control pressure provided by the control spring 458, the fluid regulator 400 is in a balanced condition and the valve plug 420 moves toward the valve seat 416 to provide a steady state flow equal to the downstream consumption of the fluid.

A pressure differential across the diaphragm 438 that is not substantially equal or balanced causes the diaphragm 438 to move the valve plug 420 relative to the valve seat 416 to modulate fluid flow through the passageway 410 to achieve a substantially constant lower outlet pressure that corresponds to the set control pressure provided by the control spring 458. In particular, a pressure provided to the second side 444 of the diaphragm 438 that is greater than a pressure provided to the first side 440 causes the diaphragm 438 to move toward the loading chamber 400 and causes the valve plug 420 to move toward the valve seat 416 to restrict or prevent fluid flow through the passageway 410. Likewise, a pressure provided to the second side 444 of the diaphragm 438 that is less than the pressure provided to the first side 440 of the diaphragm 438 causes the diaphragm 438 to move toward the sensing chamber 446 and causes the valve plug 420 to move away from the valve seat 416 to allow or increase fluid flow through the passageway 410.

As most clearly shown in FIG. 5A, when the valve plug 420 moves away from the valve seat 416, fluid flows between the inlet 412 and the outlet 414 across the orifice 418. As the fluid flows across the orifice 418, the valve plug 420 and the inner wall 508 deflect or direct the fluid in a direction 522 toward the outlet 414 and away from the throat area 464. Additionally, the valve plug 420 and the inner wall 508 may cause the fluid to be directed in an opposite direction 524 toward the orifice 418. Thus, the inner wall 508 and the valve plug 420 substantially restrict fluid flow between the orifice 418 and the throat area 464 and, thus, the sensing chamber 446 because the outer surface 510 of the valve plug 420 is in close proximity with the inner wall 508.

If the inlet pressure and/or the pressure differential across the orifice 418 are relatively low (e.g., a first inlet pressure), the fluid flows across the orifice 418 at a relatively low velocity or momentum. For low pressure applications, the inner wall 508 and the valve plug 420 provide a droop reducing mechanism because the valve plug 420 and the inner wall 508 direct the fluid flow away from the throat area 464 or the sensing chamber 446 and in the direction 522 downstream toward the outlet 414. In this manner, the valve plug 420 and the inner wall 508 cause the sensing chamber 446 to sense a lower pressure (e.g., a slightly lower pressure) than the downstream pressure to control droop of the fluid regulator 400 when, for example, there is a sudden increase in the downstream demand.

Further, unlike the known valve body 120 of FIGS. 2 and 3, the example valve body 406 employs the secondary passage 512 to prevent excessive boost of the fluid regulator 400 when, for example, a fluid flows across the orifice 418 at a relatively high velocity. For example, as the downstream demand decreases, the pressure at the outlet 414 increases and the downstream flow demand decreases. If the inlet pressure and/or pressure differential across the orifice 418 are relatively high, the fluid flows through the passageway 410 at a relatively high velocity or momentum. For relatively high pressure applications, directing the fluid flow in the directions 522 and 524 may cause the pressure of the fluid at the orifice 418 to increase.

Further, as the pressure of the fluid at the orifice 418 increases, fluid within the passageway 410 flows across the orifice 418 at a relatively high velocity. Because fluid flows through the passageway 410 at a relatively high velocity or momentum, the high velocity fluid flow may cause low pressure area in the throat area 464. In turn, the sensing chamber 446 may sense a pressure in the throat area 464 that is relatively lower than the actual downstream pressure because the valve plug 420 and the inner wall 508 deflect the high velocity fluid in the directions 522 and 524. In contrast with the valve body 120 of FIG. 1-3, the secondary passage 512 or the gap 514 directs or allows the high velocity fluid to flow in a direction 526 toward the throat 464 so that the sensing chamber 446 does not sense a pressure at the throat area 464 that is lower than the downstream pressure when the fluid flows across the orifice 418 at a relatively high velocity and, for example, there is sudden decrease in the downstream demand.

Thus, the valve body 406 includes the integral passageway 410 that significantly restricts fluid communication between the orifice 418 and the throat area 464 (via a combination of the valve plug 420 and the inner wall 508) to prevent excessive droop and the valve body 406 includes the integral secondary passage 512 that allows fluid communication between the orifice 418 and the throat area 464 (via the gap 514) to prevent excessive boost. The secondary passage 512 prevents excessive boost of the fluids regulator 400 by fluidly coupling the orifice 418 and the throat area 464 to prevent a low pressure area in the throat area 464 when, for example, the fluid flows across the orifice 418 with a relative high velocity. In turn, the secondary passage 512 enables the sensing chamber 466 to sense a pressure in the throat area 464 that is more closely representative of a downstream pressure so the fluid regulator 400 does not deviate significantly from the control pressure provided by the control spring 458. As a result, the fluid regulator 400 will have a higher accuracy classification and/or capacity.

Figure 6:
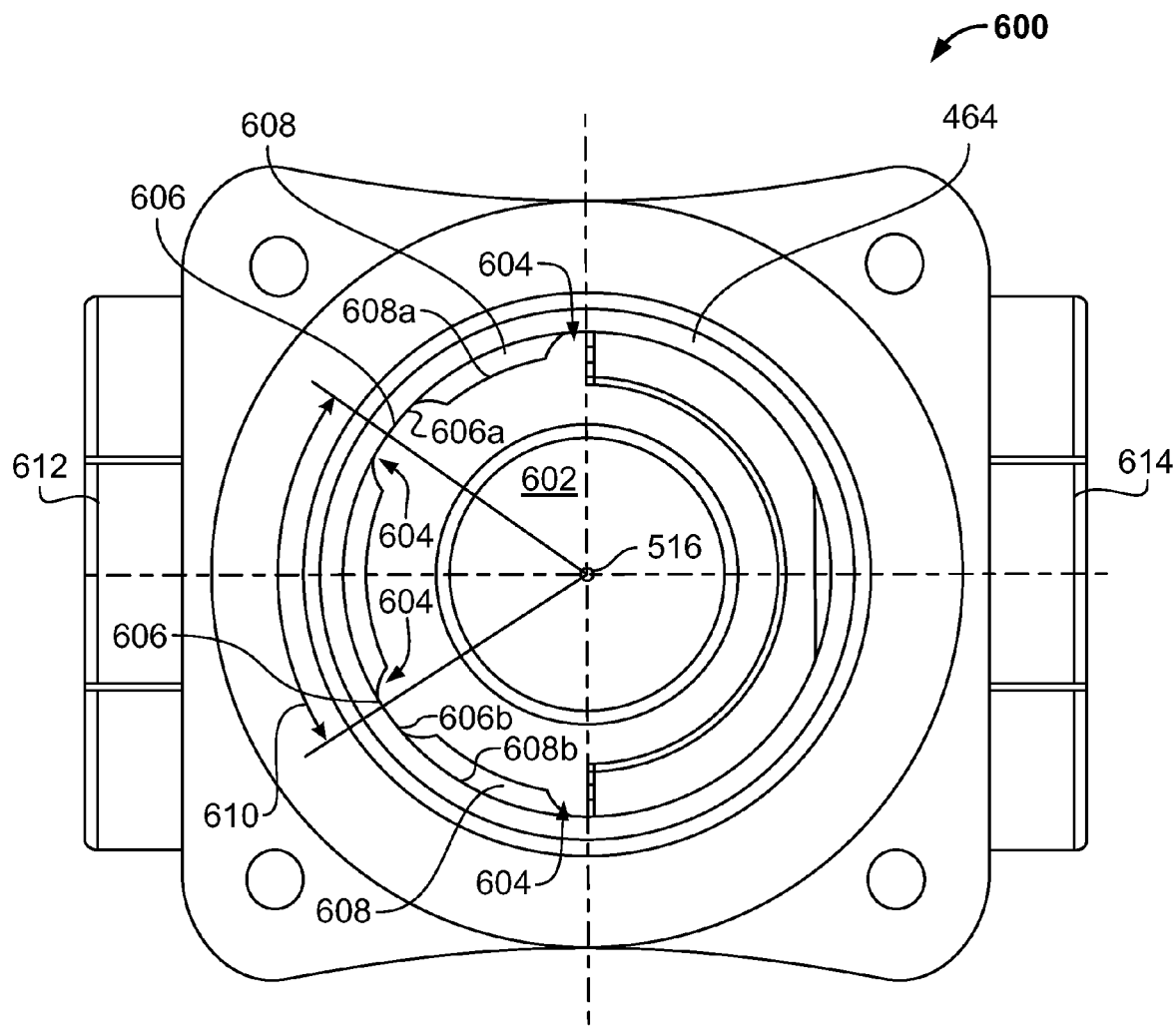
FIG. 6 is another example valve body described herein.

FIG. 6 illustrates another example valve body 600 described herein having integral boost reducing capability that can be used to implement a fluid regulator such as, for example, the fluid regulator 400 of FIG. 4. Those components of the valve body 600 that are substantially similar or identical to the components of the valve body 406 described above and that have functions substantially similar or identical to the functions of those components will not be described in detail again below. Instead, the interested reader is referred to the above corresponding descriptions.

Referring to FIG. 6, in this example, the valve body 600 includes a main or primary fluid passageway 602 and a secondary passage 604 integral with the valve body 600. In particular, the secondary passage 604 includes a plurality of ports, openings or relief wells 606. In this particular example, the ports 606 may extend between the orifice 418 and the throat area 464 of the valve body 600 such that the ports 606 define a plurality of wall portions 608 that are radially spaced at any suitable angle 610 (e.g., 30 degrees, 45 degrees, 90 degrees, etc.) about the axis 516 of the orifice 418. In this example, the wall portions 608 are equally spaced (e.g., a radial distance of 45 degrees) about the axis 516. Further, the ports 606 may partially extend between the orifice 418 and the throat area 464 such that at least a portion of the wall portions 608 (e.g., a lower end of the wall portions 608) are joined or connected, or the ports 606 may extend between the orifice 418 and the throat 464 such that the wall portions 608 are completely separated or separate pieces.

Additionally, the profile (e.g., the size, the flow path cross-section, the length, etc.) of the ports 606 and/or the wall portions 608 may be varied to control the boost. For example, ports 606 having a larger opening or flow path allow more fluid flow toward the throat area 464, thereby creating more droop to reduce boost (i.e., preventing excessive boost). In contrast, providing ports 606 having smaller openings or flow paths allows less flow, thereby increasing boost to reduce droop (i.e., preventing excessive droop).

Further, in some examples, a first port 606a and/or a first wall portion 608a may have a first profile or characteristic or flow path (e.g., a first size, dimension or profile) and a second port 606b and/or second wall portion 608b may have a second profile or characteristic or flow path (e.g., a second size, dimension or profile) that is different than the first characteristic. For example, the first port 606a may include a flow path that opens to allow more fluid flow between the orifice 418 and the throat area 464 and the second port 606b may include a flow path that restricts fluid flow between the orifice 418 and the throat area 464. Similar to the valve body 406 of FIGS. 4-6, the orifice 418 of the valve body 600 receives the valve plug 420 such that the outer surface 510 of the valve plug 420 and the wall portions 608 define a portion of the main passageway 602 to direct fluid flow between an inlet 612 and an outlet 614 and to restrict fluid flow toward the throat area 464 of the valve body 600. The ports 606 provide the secondary passage 604 to enable fluid flow toward the throat area 464 of the valve body 600.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A fluid regulator, comprising:
   a valve body having a main passageway defining an orifice to fluidly couple an inlet and an outlet, wherein the main passageway defines an inlet volume boundary between the inlet and the orifice and an outlet volume boundary between the orifice and the outlet, and a portion of the outlet volume boundary being defined by at least a portion of an inner wall of the valve body adjacent the orifice;
   a valve plug disposed within the passageway such that the inner wall substantially surrounds an outer surface of the valve plug to substantially prevent fluid flow between the inner wall and the outer surface of the valve plug and toward a sensing chamber of the fluid regulator;
   a secondary fluid passage formed in a portion of a perimeter of the inner wall of the valve body to increase fluid flow toward the sensing chamber of the fluid regulator when a fluid flows across the orifice; and
   a stem guide, the stem guide being spaced away from the inner wall.

2. A fluid regulator as defined in claim 1, wherein the secondary fluid passage is adjacent the orifice and upstream from the outlet.

3. A fluid regulator as defined in claim 1, wherein the secondary passage reduces a boost effect of the fluid regulator by creating a droop effect when a process fluid flows through the main passageway.

4. A fluid regulator as defined in claim 1, wherein the secondary fluid passage comprises a longitudinal gap formed within the inner wall between the orifice and a throat of the valve body.

5. A fluid regulator as defined in claim 4, wherein the gap extends over at least a portion of a peripheral edge of the inner wall.

6. A fluid regulator as defined in claim 4, wherein the gap defines two opposing ends of the inner wall, and wherein the opposing ends are substantially parallel to a longitudinal axis of the orifice.

7. A fluid regulator as defined in claim 6, wherein the opposing ends are spaced apart by an angle between about 5 degrees and 180 degrees relative to the longitudinal axis of the orifice.

8. A fluid regulator as defined in claim 6, wherein the opposing ends are spaced apart by an angle of about 100 degrees relative to the longitudinal axis of the orifice.

9. A fluid regulator as defined in claim 1, wherein the secondary passage comprises one or more relief ports formed in the inner wall to allow fluid flow between the inner wall and the outer surface of the valve plug via the one or more relief ports and toward a throat of the valve body.

10. A fluid regulator as defined in claim 9, wherein the one or more relief ports are at least partially disposed over the portion of the perimeter of the inner wall.

11. A fluid regulator as defined in claim 10, wherein the one or more relief ports are radially spaced relative to a longitudinal axis of the orifice.

12. A fluid regulator as defined in claim 11, wherein the one or more relief ports are spaced equally about the longitudinal axis of the orifice.

13. A fluid regulator as defined in claim 10, wherein the one or more relief ports have substantially similar profiles and shapes to provide substantially similar flow rates between the orifice and the throat.

14. A fluid regulator as defined in claim 1, wherein the second fluid passage comprises a gap extending between two opposing ends of the inner wall.

15. A fluid regulator as defined in claim 1, wherein the second fluid passage is formed by a recess in the inner wall of the valve body.

16. A fluid regulator as defined in claim 1, wherein the inner wall comprises a side inner wall of the valve body extending between the orifice and the stem guide.

17. A fluid valve body comprising:
    a first passageway integrally formed with the valve body to define an orifice that fluidly couples an inlet of the passageway to an outlet of the passageway, a portion of the first passageway defined by an inner wall of the valve body downstream from the orifice; and
    a second passageway formed by a recess in the inner wall of the valve body such that the recess extends between opposing ends of the inner wall, the second passageway to increase a fluid flow rate between the orifice and a throat area of the valve body that is to be in fluid communication with a sensing chamber of an actuator when the valve body is coupled to the actuator, wherein the inner wall has an inner surface to be in close proximity to an outer surface of a valve plug when the valve plug is disposed within the first passageway such that the inner wall and the valve plug direct a fluid flow toward the outlet and restrict fluid flow between the outer surface of the valve plug and the inner surface of the inner wall and the second passageway allows fluid flow between the outer surface of the valve plug and the throat area of the valve body.

18. A fluid valve body of claim 17, wherein the first passageway restricts fluid communication between the orifice and the throat area when the valve plug is disposed within the first passageway adjacent the orifice.

19. A fluid valve body of claim 18, wherein the second passageway allows fluid communication between the orifice and the throat area when the valve plug is disposed within the first passageway adjacent the orifice.

20. A fluid valve body of claim 17, wherein the inner wall has a C-shaped cross-section.

21. A fluid valve body of claim 17, wherein the inner wall comprises a cylindrical side wall and the recess forms a gap in the cylindrical side wall.

22. A valve body for use with fluid regulators, comprising:
    means for controlling fluid flow through a passageway of the valve body, the means for controlling fluid flow being slidably disposed adjacent an inner wall of the passageway defined by the valve body such that the inner wall and the means for controlling fluid flow direct fluid through an orifice of the passageway toward an outlet of the valve body and restrict fluid flow toward a throat area of the passageway, the inner wall being downstream from the orifice and defining a perimeter; and
    means for directing fluid flowing through the orifice toward the throat area when the fluid flows across the orifice at a relatively high velocity, wherein the means for directing fluid flowing through the orifice and toward the throat area is formed via a recessed gap along a portion of the perimeter of the inner wall of the passageway of the valve body such that the means for directing fluid extends between opposing ends of the inner wall.

* * * * *